(12) United States Patent
Pontarollo

(10) Patent No.: US 6,456,151 B1
(45) Date of Patent: Sep. 24, 2002

(54) CAPACITIVE CHARGE PUMP DEVICE AND METHOD FOR CONTROLLING THE SAME

(75) Inventor: Serge Pontarollo, Saint Martin le Vinous (FR)

(73) Assignee: STMicroelectronics S.A., Gentilly (FR)

(*) Notice: Subject to any disclaimer, the term of this patent is extended or adjusted under 35 U.S.C. 154(b) by 0 days.

(21) Appl. No.: 09/526,810

(22) Filed: Mar. 16, 2000

(30) Foreign Application Priority Data

Mar. 16, 1999 (FR) .............................................. 99 03238

(51) Int. Cl.[7] .............................. G05F 1/10; G05F 3/02
(52) U.S. Cl. ........................ 327/536; 327/198; 327/538
(58) Field of Search ................................ 327/536, 537, 327/540, 541, 538, 534, 535, 543, 545, 546, 143, 198

(56) References Cited

U.S. PATENT DOCUMENTS

| 5,258,662 A |   | 11/1993 | Skovmand ................... 327/544 |
|---|---|---|---|
| 5,347,170 A | * | 9/1994 | Hayakawa et al. .......... 327/541 |
| 5,481,221 A | * | 1/1996 | Gariboldi et al. ........... 327/536 |
| 5,672,992 A |   | 9/1997 | Nadd .......................... 327/390 |
| 5,780,895 A | * | 7/1998 | Barret et al. ................. 257/328 |
| 5,880,623 A | * | 3/1999 | Levinson ..................... 327/540 |

OTHER PUBLICATIONS

French Search Report dated Nov. 4, 1999 with Annex to French Application No. 99–03238.

* cited by examiner

Primary Examiner—Terry D. Cunningham
Assistant Examiner—Quan Tra
(74) Attorney, Agent, or Firm—Lisa K. Jorgenson; Stephen Bongini; Fleit, Kain, Gibbons, Gutman & Bongini P.L.

(57) ABSTRACT

A method is provided for controlling a capacitive charge pump. The charge pump is regulated by a regulating voltage when the supply voltage is greater than the regulating voltage. When the supply voltage is less than a triggering voltage, which is less than or equal to the regulating voltage, the charge pump is automatically supplied between the supply voltage and ground. In one preferred method, the charge pump has a first supply terminal connected to the supply voltage and a second supply terminal that is automatically grounded when the supply voltage is less than the triggering voltage. Also provided is a capacitive charge pump device that includes a charge pump having first and second supply terminals, a voltage regulator delivering a regulating voltage, a switch connected between the second supply terminal and ground, and switch control circuitry for automatically controlling the switch. The first supply terminal is connected to a supply voltage and the voltage regulator is connected between the first and second supply terminals. The switch control circuitry opens the switch when the supply voltage is greater than or equal to a triggering voltage, which is less than the regulating voltage, and closes the switch when the supply voltage is less than the triggering voltage.

21 Claims, 3 Drawing Sheets

CAPACITIVE CHARGE PUMP DEVICE AND METHOD FOR CONTROLLING THE SAME

CROSS-REFERENCE TO RELATED APPLICATIONS

This application is based upon and claims priority from prior French Patent Application No. 99-03238, filed Mar. 16, 1999, the entire disclosure of which is herein incorporated by reference.

BACKGROUND OF THE INVENTION

1. Field of the Invention

The present invention relates to capacitive charge pumps, and more specifically to capacitive charge pumps that operate with a low supply voltage and methods for controlling the same.

2. Description of Related Art

A charge pump is a device for generating a voltage that is greater than a given supply voltage. Charge pumps are often, but not exclusively, used to control the gate of a floating-source power transistor that supplies a load (for example, an electric motor). A conventional "capacitive" charge pump includes two different capacitors with the first injecting charges into the second, diodes that allow current to flow only in one direction, and an oscillator. Such a configuration makes it possible to obtain a voltage substantially equal to twice the supply voltage across the terminals of the second capacitor of the pump in the final charging state of the pump.

In practice, most charge pumps are "floating" and follow the supply voltage. Furthermore, practical charge pumps are typically regulated because they are often produced in CMOS logic. More specifically, they are based on complementary field-effect transistors with insulated gate that are limited in voltage (typically to 5 or 12 volts), while the supply voltage can exceed 12 volts (for example, when it is delivered by a properly charged battery of a vehicle). When the supply voltage is greater than the regulating voltage, the voltage delivered by the charge pump is reduced by an average voltage drop which depends on the current consumed at the output of the pump, the frequency of the oscillator, and the capacitance of the first capacitor of the pump.

At low supply voltage (i.e., when the supply voltage is less than the regulating voltage), the voltage delivered at the output of the charge pump is also reduced by the average voltage drop mentioned above, and by an auxiliary voltage term depending on the characteristics of the voltage regulator, in particular the saturation voltage of the associated current source. In order to compensate for these voltage losses in the voltage delivered at the output of the charge pump, and particularly at low supply voltages, there have been proposed solutions that aim to reduce the average voltage drop mentioned above. These solutions have been directed to increasing the capacitance of the first capacitor and/or the value of the frequency of the oscillator. However, such solutions are unsatisfactory, especially in terms of size and in terms of current consumption.

SUMMARY OF THE INVENTION

In view of these drawbacks, it is an object of the present invention to overcome the above-mentioned drawbacks and to reduce the charge pump voltage loss occurring at low supply voltage.

Another object of the present invention is to reduce the charge pump voltage loss at low supply voltages by focusing on the auxiliary voltage term rather than the average voltage drop.

One embodiment of the present invention provides a method for controlling a capacitive charge pump that is connected to a supply voltage. According to the method, the charge pump is regulated by a regulating voltage when the supply voltage is greater than the regulating voltage. When the supply voltage is less than a triggering voltage, which is less than or equal to the regulating voltage, the charge pump is automatically supplied between the supply voltage and ground. Thus, the auxiliary voltage term is reduced or eliminated by short-circuiting one of the supply terminals of the charge pump to ground. In a preferred method, the charge pump has a first supply terminal connected to the supply voltage and a second supply terminal that is automatically grounded when the supply voltage is less than the triggering voltage.

Another embodiment of the present invention provides a capacitive charge pump device that includes a charge pump having first and second supply terminals, a voltage regulator delivering a regulating voltage, a switch connected between the second supply terminal and ground, and switch control circuitry for automatically controlling the switch. The first supply terminal is connected to a supply voltage and the voltage regulator is connected between the first and second supply terminals. The switch control circuitry opens the switch when the supply voltage is greater than or equal to a triggering voltage, which is less than the regulating voltage, and closes the switch when the supply voltage is less than the triggering voltage. In one preferred embodiment, the switch includes an insulated-gate field-effect transistor whose drain-source voltage difference is low when the transistor is in an on state.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
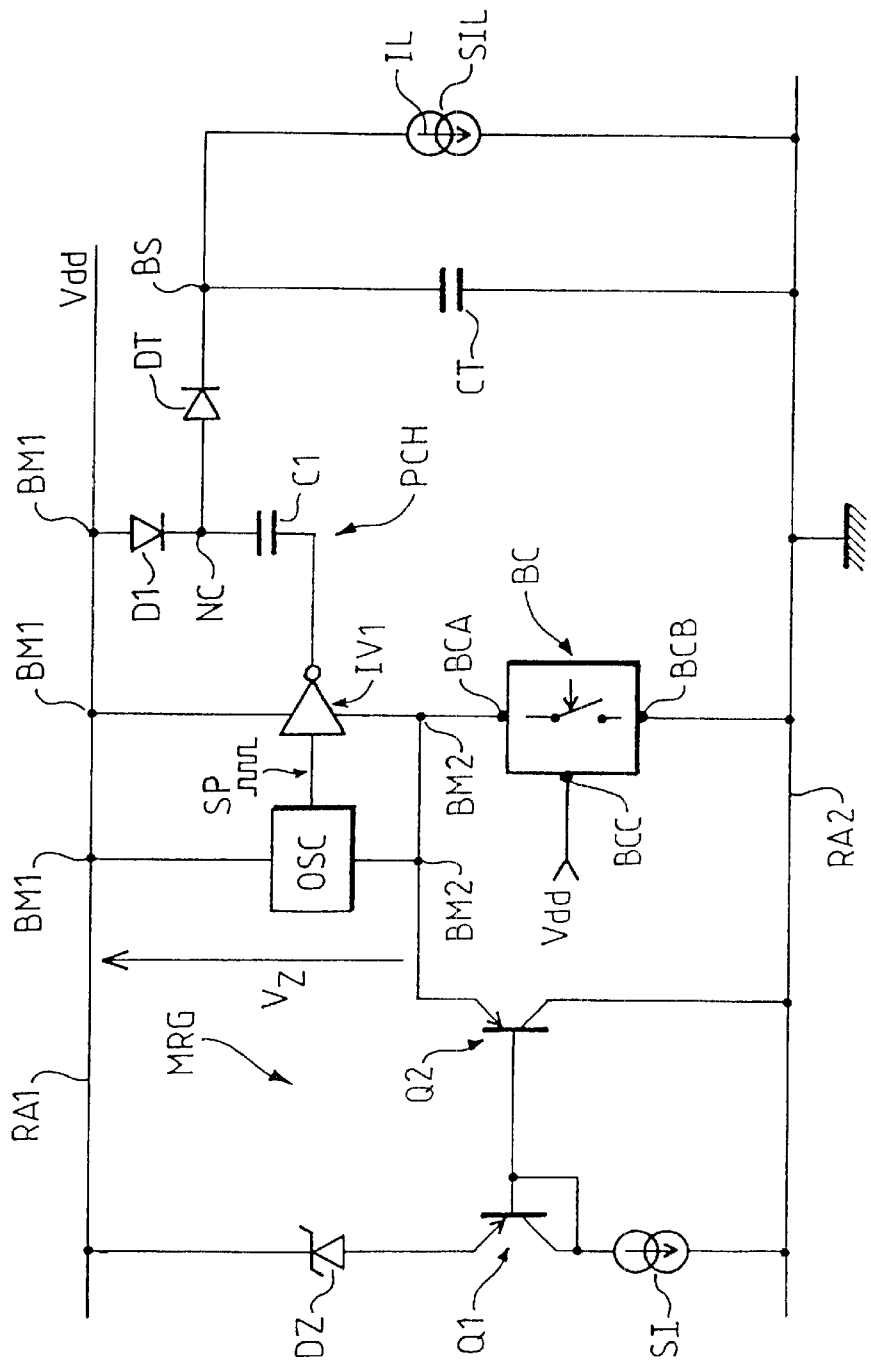
FIG. 1 is a schematic diagram showing the internal architecture of a charge pump device according to a first embodiment of the present invention.

Preferred embodiments of the present invention will be described in detail hereinbelow with reference to the attached drawings.

In preferred embodiments of the present invention, a charge pump is regulated by a regulating voltage when the supply voltage is greater than the regulating voltage, and is supplied automatically between the supply voltage and ground when the supply voltage is less than a triggering voltage, which is less than or equal to the regulating voltage. Thus, the auxiliary voltage term is reduced or eliminated by short-circuiting one of the supply terminals of the charge pump to ground. In one preferred embodiment, the charge pump has a first supply terminal connected to the supply voltage and a second supply terminal that is automatically grounded when the supply voltage is less than the triggering voltage. When the supply voltage is greater than or equal to the triggering voltage, the second supply voltage is automatically floated by disconnecting it from the ground. With the second terminal floating, the regulating voltage is applied between the two supply terminals of the pump when the supply voltage is greater than the regulating voltage.

Further embodiments of the present invention provide a capacitive charge pump device that includes a charge pump, a voltage regulator, a switch, and switch control circuitry. The charge pump has a first supply terminal connected to a supply voltage, and the voltage regulator is connected between the first and second supply terminals of the charge pump. The switch is connected between the second supply terminal and ground. The switch control circuitry automatically controls the switch so as to open the switch when the supply voltage is greater than or equal to a triggering voltage that is less than the regulating voltage, and close the switch when the supply voltage is less than the triggering voltage.

In one embodiment, the switch has an insulated-gate field-effect transistor that is gate-controlled so as to assume an off or on state, and whose drain-source voltage difference when the transistor is in the on state is low. When the switch is formed from a transistor, it is important for this drain-source voltage difference to be low when the transistor is on in order to best approximate a condition of perfect short-circuit to ground, so as to cancel the auxiliary voltage term as much as possible. Such a transistor can be chosen on the basis of the specific application. Fort example, it has been found that a drain-source voltage difference when the transistor is in its on state of less than or equal to 30 mvolts allows the desired advantages of the present invention to be obtained.

A larger channel produces a smaller drain-source voltage for the transistor when it is on. However, in order to minimize the size of the device, it is preferable for the transistor that forms the switch to be a vertical field-effect transistor with double-diffusion insulated gate (VDMOS transistor) formed by several tens of elementary cells (for example, 64) which are connected in parallel and are each formed by a single vertical field-effect transistor with double-diffusion insulated gate whose channel width to channel length ratio is on the order of several tens (for example, 34 in the case of conventional bipolar CMOS DMOS, or "BCD", technology).

In a preferred embodiment of the present invention, the regulator includes a regulating diode whose threshold voltage value substantially defines the value of the regulating voltage, and the switch control circuitry includes an auxiliary diode connected in series with a resistive divider bridge, and a control transistor whose gate is connected to the center point of the divider bridge and to the anode of the auxiliary diode. The source of the control transistor is grounded and its drain is connected to the gate of the transistor of the switch and to the supply voltage via a drain resistor. The value of the threshold voltage of the auxiliary diode and the values of the resistors of the divider bridge define the value of the triggering voltage which is chosen to be less than or equal to the threshold voltage of the regulating diode.

FIG. 1 shows the internal architecture of a charge pump device according to a first embodiment of the present invention. As shown, the charge pump device includes a charge pump PCH, a voltage regulator MRG, and a control unit BC whose function and structure are discussed below.

The capacitive charge pump PCH includes an oscillator OSC that delivers a periodic square-wave signal SP (generally having a duty cycle of 50% and a high frequency, typically of more than 1 MHz). The oscillator OSC is usually produced in CMOS logic.

The square-wave signal SP is delivered to a power inverter IV1 whose output is connected to a first electrode of a first capacitor C1, the second electrode of which is connected to the cathode of a first diode D1. The anode of this first diode D1 is connected to a line RA1 that provides the supply voltage Vdd. For example, in an exemplary automotive application, the supply voltage Vdd can be the voltage delivered by the battery of the vehicle. The charge pump PCH also includes a terminal diode DT whose anode is connected to the node NC common to the first diode D1 and the first capacitor C1. A terminal capacitor CT is connected in series with the terminal diode DT between the common node NC and a second line RA2 that forms a ground plane.

The charge pump PCH includes two supply terminals BM1 and BM2. The first supply terminal BM1 is connected to the supply voltage Vdd. These two supply terminals BM1 and BM2 of the charge pump are also the two supply terminals of the oscillator OSC and the inverter IV1. In an exemplary application, the charge pump PCH provides the current needed to charge the gate of a power MOS transistor whose source is floating, and to keep this transistor on (represented in FIG. 1 by a current source SIL delivering a current IL).

In the exemplary automotive application, when the battery is fully charged, the supply voltage Vdd may be greater than the supply voltage that is acceptable for the components of the charge pump. Thus, a voltage regulator MRG is generally combined with the charge pump PCH. In this embodiment, the voltage regulator MRG is illustratively formed by a regulating diode DZ (for example, a Zener diode having a threshold voltage on the order of 10 volts and which substantially defines the value of the regulating voltage $V_2$). The cathode of this regulating diode DZ is connected to the metallization RA1, whereas the anode of this diode is connected to one of the transistors Q1 of a current mirror, which is formed by two transistors Q1 and Q2. Furthermore, a current source SI (representing the collector current of transistor Q1) is connected between the collector of this transistor Q1 and ground. The emitter of transistor Q2 is connected to the second supply terminal BM2 of the charge pump.

Figure 2:
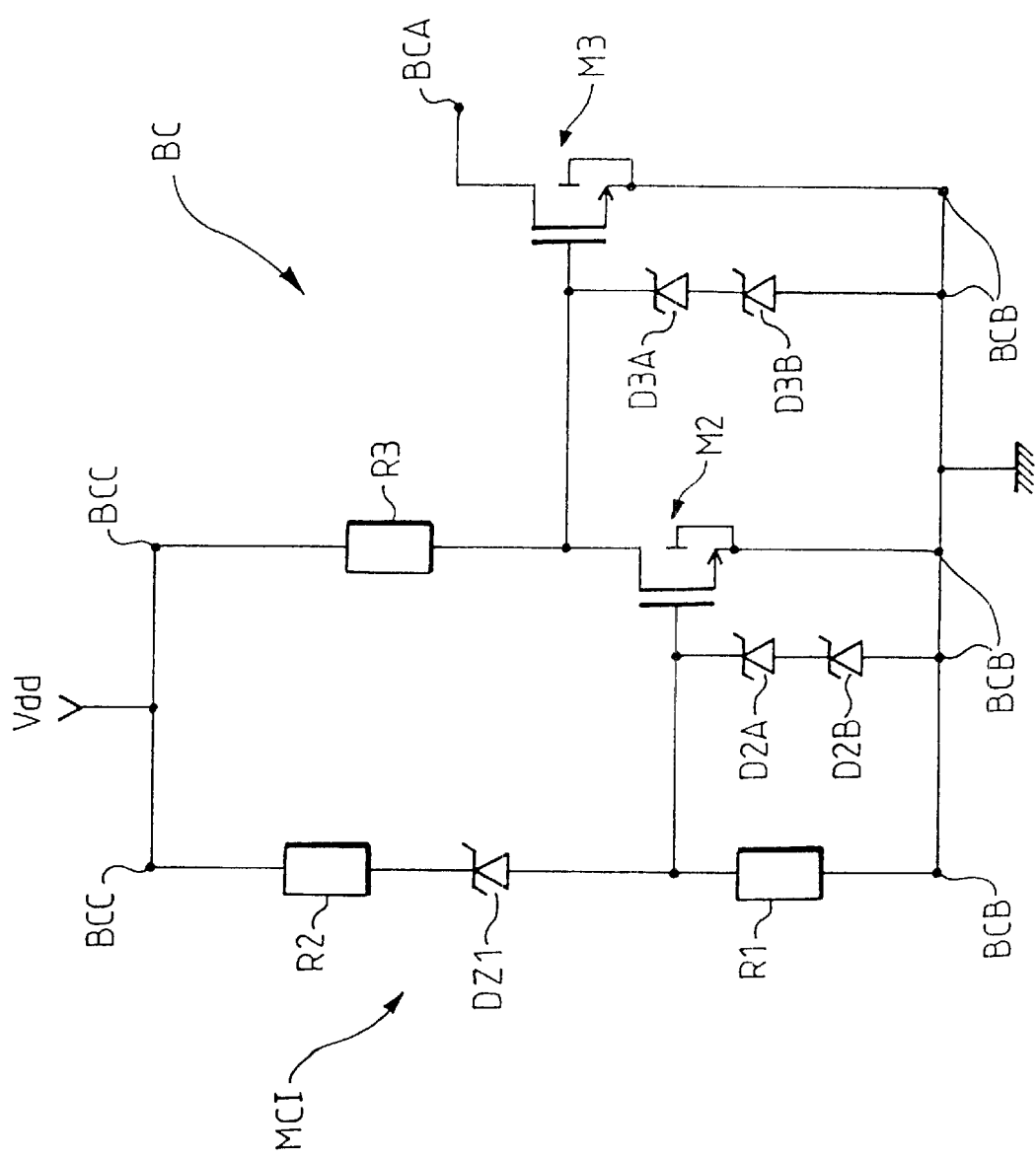
FIG. 2 is a schematic diagram showing in more detail a part of the device of FIG. 1 according to a preferred embodiment.

The control unit BC includes a switch and switch control circuitry for automatically controlling the switch. The control unit is arranged between the second supply terminal BM2 and the ground line RA2. The control unit BC has a first terminal BCA connected to supply terminal BM2, a second terminal BCB connected to ground, and a third terminal BCC connected to the supply voltage Vdd. FIG. 2 illustrates a preferred embodiment of the control unit. As shown, the switch of this control unit is formed by an insulated-gate field-effect transistor M3 and two protecting diodes D3A and D3B which are connected in series between the gate of the transistor M3 and terminal BCB. The protecting diodes limit the voltage at the gate of the transistor M3. The transistor M3 has its drain connected to terminal BCA, and its source connected to terminal BCB and the substrate (bulk). The internal structure of the transistor M3 is discussed in further detail below.

In this embodiment, the switch control circuitry MC1 for controlling the transistor M3 includes a resistive divider bridge R1 and R2 offset by an auxiliary diode DZ1 (for example, a Zener diode). More precisely, the two resistors R1 and R2 of the divider bridge, which have equal values in this embodiment, are connected in series between terminals BCC and BCB, and the auxiliary diode DZ1 is connected in series between the two resistors R1 and R2. The anode of the auxiliary diode DZ1 is connected to the center point of the resistive bridge.

The switch control circuitry MCI also includes a control transistor M2, which is also an insulated-gate field-effect transistor whose internal structure is discussed in further detail below. The gate of transistor M2 is connected to the anode of the auxiliary diode DZ1. The source of transistor M2 is connected to the substrate and to terminal BCB. The drain of transistor M2 is connected to terminal BCC via a drain resistor R3 and to the gate of the transistor M3. Here again, two protecting diodes D2A and D2B limit the voltage at the gate of the transistor M2.

The operation of the device of FIGS. 1 and 2 will now be described. The threshold value of the auxiliary diode DZ1, the values of the resistors R1 and R2 of the divider bridge, and the value of the gate-source voltage of the control transistor M2 define a triggering voltage value (or triggering threshold value) for the control unit BC. More precisely, this triggering threshold or triggering voltage is given by the following formula.

$$V_{DZ1}+2(V_{GSM2}) \qquad (1)$$

In formula (1), $V_{DZ1}$ denotes the threshold value of diode DZ1, and $V_{GSM2}$ denotes the gate-source voltage of transistor M2. The coefficient 2 appears because the values of the resistors R1 and R2 are equal.

When the supply voltage Vdd becomes less than the triggering voltage, the transistor M2 is automatically turned off. As a result, the voltage Vdd is present at the gate of transistor M3, which turns this transistor M3 on and consequently automatically connects terminal BCA to terminal BCB (i.e., to the ground plane). On the other hand, if the supply voltage Vdd is greater than or equal to the triggering threshold, transistor M2 is on, which turns transistor M3 off so as to automatically float terminal BCA and consequently the second supply terminal BM2 of the charge pump. The terminals are said to be "floating" because their voltages are not fixed (for example, by a connection to ground or a fixed voltage) but can fluctuate or "float".

The triggering voltage is typically modified by modifying the ratio of the resistors R2/R1, because the threshold voltage $V_{DZ1}$ of the diode DZ1 is fixed for a given technology. Preferably, a triggering voltage as close as possible to the threshold voltage of the regulating diode DZ is chosen. In practice, the triggering threshold lies in the lower vicinity of the threshold voltage of the regulating diode. Thus, for a regulating diode having a threshold voltage substantially equal to 10 volts, a typical value of the triggering voltage is on the order of 9.75 volts ($V_{DZ1}$ on the order of 5.35 volts, and $V_{GSM2}$ on the order of 2.4 volts).

FIG. 1 will now be discussed in more detail. If the supply voltage Vdd is greater than the threshold voltage of the regulating diode DZ, and consequently the triggering threshold, supply terminal BM2 is floating and the regulating voltage VZ (i.e., the threshold voltage of the diode DZ) is substantially applied to the terminals of the charge pump (disregarding the small corrective term equal to $V_{BEQ2}-V_{BEQ1}$). The first capacitor C1 then becomes charged up to the supply voltage Vdd through diode D1 (neglecting the voltage drop in the diode D1). When the output voltage of the inverter IV1 reaches the supply voltage Vdd, the first capacitor C1 transfers some of its charge to the terminal capacitor CT through the terminal diode DT. In the final state, the voltage $V_{BS}$ at the output terminal BS is given by the following formula.

$$V_{BS}=Vdd+V_Z-V_{drop} \qquad (2)$$

In formula (2), the term $V_{drop}$ is the average voltage drop defined by the following formula.

$$V_{drop}=2(VD)+IL/f \times C1 \qquad (3)$$

In formula (3), the term VD denotes the voltage drop of a forward-biased diode (on the order of 0.7 volts), IL denotes the current flowing through the load supplied by the charge pump, f denotes the frequency of the oscillator, and C1 denotes the capacitance of the first capacitor C1.

If the supply voltage Vdd drops (for example, due to discharging of the battery of the vehicle) becomes less than the triggering threshold (i.e., less than the voltage $V_z$), then the voltage $V_{BS}$ is given by the following formula.

$$V_{BS}=Vdd+(Vdd-V_M)-V_{drop} \qquad (4)$$

In formula (4), the auxiliary term $V_M$ is defined by the following formula.

$$V_M=Vsat+V_{BEQ2} \qquad (5)$$

In formula (5), the term Vsat denotes the saturation voltage of the current source SI and the term $V_{BEQ2}$ denotes the emitter/collector voltage difference of transistor Q2.

Thus, as shown by formula (4), if the second supply terminal BM2 remained floating, the value of voltage $V_{BS}$ would experience a loss due to both the auxiliary term $V_M$ and the term $V_{drop}$. While the conventional solutions described above aim to minimize the term $V_{drop}$ so as to reduce the voltage loss in voltage $V_{BS}$ (for example, by increasing the frequency of the oscillator to the detriment of the consumption, or by increasing the capacitance C1 to the detriment of the area of the circuit), the present invention aims to minimize or eliminate the auxiliary term $V_M$ by closing the switch M3 of the control unit BC (i.e., by short-circuiting the second supply terminal BM2 to ground).

In order to optimize this short-circuit, it is preferable for the transistor M3 that forms the switch of the control unit to have a low drain-source voltage difference when this transistor is in its on state. As an example, it has been found that satisfactory results are obtained with a drain-source voltage difference less than or equal to 30 mvolts when the transistor is in its on state. In order to limit the size of transistor M3 on the silicon wafer on which the control unit is produced, use will advantageously be made of a vertical field-effect transistor with double-diffusion insulated gate (VDMOS transistor) that is formed by several tens of elementary cells (for example, 64 in an 8×8 layout) which are connected in parallel. Each of the elementary cells is formed by a single vertical field-effect transistor with double-diffusion insulated gate whose W/L ratio (channel width/channel length) is on the order of several tens.

In one exemplary embodiment using conventional BCD technology, each VDMOS cell has a channel width equal to 34 microns and a channel length (i.e., drain-source distance) equal to 1 micron. Therefore, a transistor M3 is obtained with a very high channel width, and this leads to a low drain-source voltage difference VDS on the order of 20 mV and leading an occupied area on the order of 0.05 mm². Furthermore, the drain resistance R3 is preferably high so as to limit the total consumption of the circuit. A value on the order of several hundreds of kiloohms (for example, 350 kiloohms) has been judged satisfactory. Similarly, again so as not to compromise the total consumption of the circuit, it is also preferable for the resistors R1 and R2 of the divider bridge to have high values. In an exemplary embodiment, values of at least equal to 100 kiloohms (for example, 200 kiloohms) have been judged satisfactory.

Further, it is particularly advantageous for the resistors R1 and R2 to be of the same type and to be matched (i.e., to be produced simultaneously and side by side on the same silicon wafer and with the same fabrication process) so that the variations in their resistances as a function of temperature compensate one another, and thus make the triggering threshold almost independent of operating temperature. Transistor M2 may also be a VDMOS transistor, but of smaller size (for example, made of four elementary VDMOS cells). Such a size provides a satisfactory compromise between the area occupied and the need for transistor M2 to conduct current in its on state.

The control unit BC makes it possible to optimize the operation of the charge pump at low supply voltages (i.e., when the supply voltage becomes less than the triggering threshold), while allowing the charge pump to be regulated at high supply voltages (i.e., greater than the regulating voltage DZ). It is preferable to choose a triggering threshold as close as possible to the threshold voltage of the regulating diode DZ, so as to reduce the operating range of the charge pump in which the supply voltage Vdd lies between the triggering threshold and the threshold voltage of the regulating diode DZ.

Figure 3:
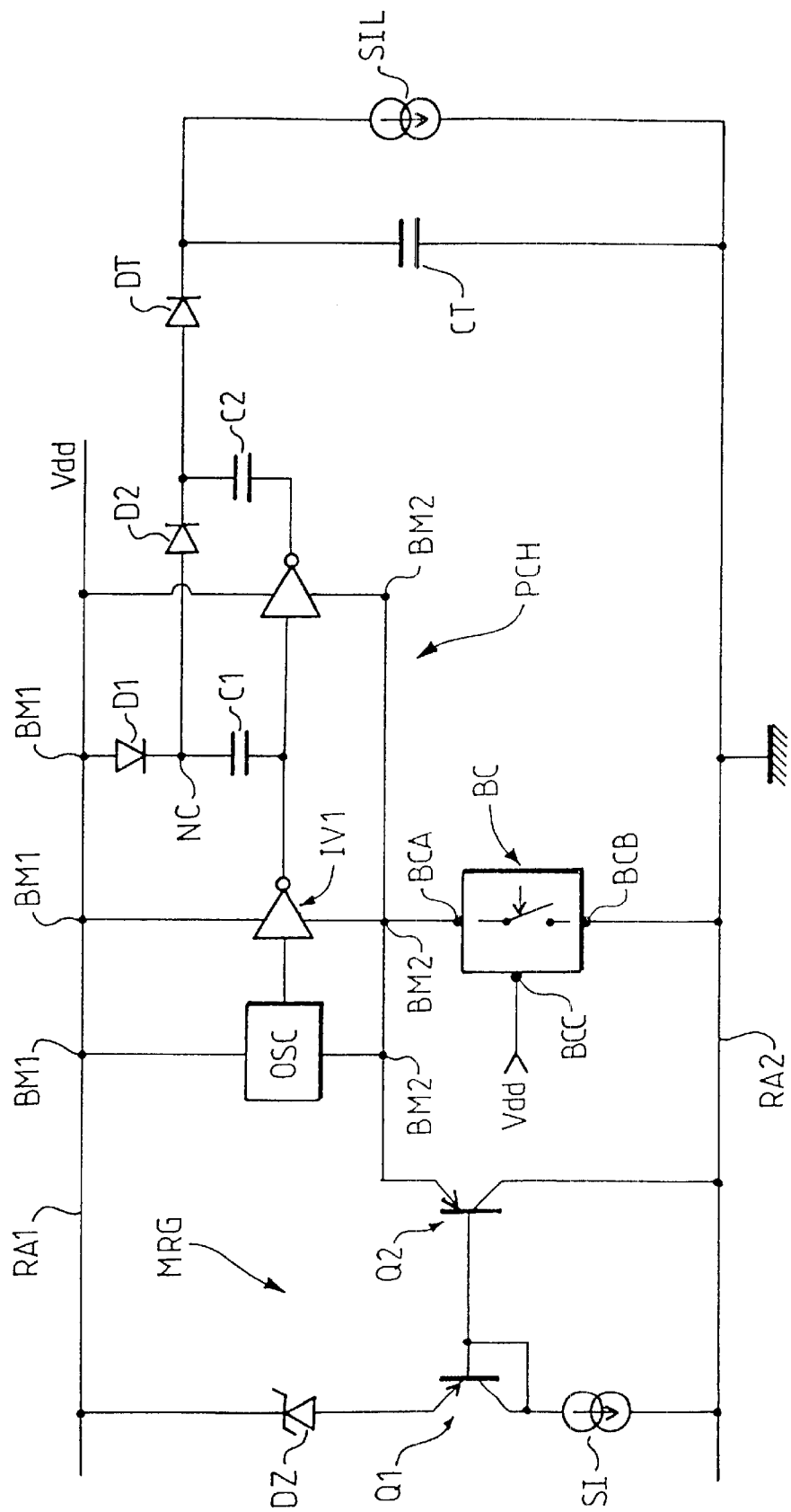
FIG. 3 is a schematic diagram showing a charge pump device according to a second embodiment of the present invention.

FIG. 3 shows a charge pump device according to a second embodiment of the present invention. The description given above with reference to FIGS. 1 and 2 also applies to the embodiment in FIG. 3. In the second embodiment, the first stage of the charge pump (including the first inverter IV1 and the first capacitor C1) is supplemented by a second stage. The second stage includes a second inverter IV2 connected to the output of the first inverter IV1, and a second capacitor C2 connected between the output of the second inverter IV2 and the cathode of a second diode D2 of the second stage.

The anode of the second diode is connected to the node NC common to diode D1 and the first capacitor C1 of the first stage. The second inverter IV2 is connected between the two supply terminals BM1 and BM2, and the terminal diode DT and the terminal capacitor CT are connected in series between ground and the node common to the diode D2 and the capacitor C2 of the second stage. The second embodiment makes it possible to obtain a voltage at the output terminal BS that is substantially equal to three times the supply voltage Vdd in the final stage of charging of the pump.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for controlling a capacitive charge pump that is connected to a supply voltage, said method comprising the steps of:

regulating the charge pump by a regulating voltage when the supply voltage is greater than the regulating voltage; and automatically supplying the charge pump between the supply voltage and ground when the supply voltage is less than a triggering voltage, which is less than or equal to the regulating voltage, wherein the charge pump has a first supply terminal connected to the supply voltage and a second supply terminal, and in the step of automatically supplying, the second supply terminal is automatically grounded when the supply voltage is less than the triggering voltage.

2. The method as defined in claim 1, further comprising the step of:

when the supply voltage is greater than or equal to the triggering voltage, automatically floating the second supply terminal by disconnecting it from ground, so that the second terminal is floating and the regulating voltage is substantially applied between the two supply terminals of the charge pump when the supply voltage is greater than the regulating voltage.

3. A capacitive charge pump device comprising:

a charge pump having first and second supply terminals, the first supply terminal being connected to a supply voltage;

a voltage regulator delivering a regulating voltage, the voltage regulator being connected between the first and second supply terminals;

a switch connected between the second supply terminal and ground; and switch control circuitry for automatically controlling the switch, the switch control circuitry opening the switch when the supply voltage is greater than or equal to a triggering voltage, which is less than the regulating voltage, and closing the switch when the supply voltage is less than the triggering voltage.

4. The device as defined in claim 3, wherein the switch includes an insulated-gate field-effect transistor whose drain-source voltage difference is less than or equal to approximately 30 millivolts when the transistor is in an on state.

5. The device as defined in claim 4, wherein the drain-source voltage difference, when the transistor is in the on state is less than or equal to approximately 20 millivolts.

6. The device as defined in claim 3, wherein the switch includes an insulated-gate field-effect transistor, the transistor being a vertical field-effect transistor with double-diffusion insulated gate.

7. The device as defined in claim 6, wherein the vertical field-effect transistor is formed by a plurality of elementary cells that are connected in parallel, each of the elementary cells being formed by a single vertical field-effect transistor with double-diffusion insulated gate.

8. The device as defined in claim 3, wherein the switch control circuitry includes:

a resistive divider bridge including a plurality of resistors;

an auxiliary diode connected in series with the resistive divider bridge; and a control transistor having a gate coupled to a center point of the divider bridge and to the anode of the auxiliary diode, a source coupled to ground, and a drain coupled to the gate of a transistor of the switch and to the supply voltage, wherein the threshold voltage of the auxiliary diode and the values of the resistors of the divider bridge define the value of the triggering voltage.

9. The device as defined in claim 8, wherein the regulator includes a regulating diode whose threshold voltage value substantially defines the value of the regulating voltage.

10. The device as defined in claim 8, wherein the resistors of the divider bridge are matched and have values of at least one hundred kiloohms, and the drain of the control resistor is coupled to the supply voltage through a drain resistor having a value of at least two hundred kiloohms.

11. The device as defined in claim 3, wherein the charge pump includes:

an oscillator;

at least one stage that includes an inverter, a diode, and a capacitor connected in series between the output of the oscillator and the first supply terminal; and a terminal diode and a terminal capacitor connected in series and coupled between ground and a node common to the diode and the capacitor, wherein the oscillator and the inverter are coupled to the two supply terminals.

12. The device as defined in claim 11, wherein the charge pump has two stages each including an inverter, a capacitor, and a diode, the inverter of the second stage is connected between the two supply terminals and has its input connected to the output of the inverter of the first stage, the diode of the second stage is connected to the node common to the diode and the capacitor of the first stage, and the terminal diode and the terminal capacitor are connected in series between ground and a node common to the diode and the capacitor of the second stage.

13. An apparatus including a load and a capacitive charge pump device that is coupled to the load, said capacitive charge pump device comprising:

a charge pump having first and second supply terminals, the first supply terminal being connected to a supply voltage;

a voltage regulator delivering a regulating voltage, the voltage regulator being connected between the first and second supply terminals;

a switch connected between the second supply terminal and ground; and switch control circuitry for automatically controlling the switch, the switch control circuitry opening the switch when the supply voltage is greater than or equal to a triggering voltage, which is less than the regulating voltage, and closing the switch when the supply voltage is less than the triggering voltage.

14. The apparatus as defined in claim 13, wherein the switch includes an insulated-gate field-effect transistor whose drain-source voltage difference is less than or equal to 30 millivolts when the transistor is in an on state.

15. The apparatus as defined in claim 14, wherein the switch includes a vertical field-effect transistor with double-diffusion insulated gate.

16. The apparatus as defined in claim 15, wherein the vertical field-effect transistor is formed by a plurality of elementary cells that are connected in parallel, each of the elementary cells being formed by a single vertical field-effect transistor with double-diffusion insulated gate.

17. The apparatus as defined in claim 13, wherein the switch control circuitry includes:

a resistive divider bridge including a plurality of resistors;

an auxiliary diode connected in series with the resistive divider bridge; and a control transistor having a gate coupled to a center point of the divider bridge and to the anode of the auxiliary diode, a source coupled to ground, and a drain coupled to the gate of the transistor of the switch and to the supply voltage, wherein the threshold voltage of the auxiliary diode and the values of the resistors of the divider bridge define the value of the triggering voltage.

18. The apparatus as defined in claim 17, wherein the regulator includes a regulating diode whose threshold voltage value substantially defines the value of the regulating voltage.

19. The apparatus as defined in claim 17, wherein the resistors of the divider bridge are matched and have values of at least one hundred kiloohms, and the drain of the control resistor is coupled to the supply voltage through a drain resistor having a value of at least two hundred kiloohms.

20. The apparatus as defined in claim 13, wherein the charge pump includes:

an oscillator;

at least one stage that includes an inverter, a diode, and a capacitor connected in series between the output of the oscillator and the first supply terminal; and a terminal diode and a terminal capacitor connected in series and coupled between ground and a node common to the diode and the capacitor, wherein the oscillator and the inverter are coupled to the two supply terminals.

21. The apparatus as defined in claim 20, wherein the charge pump has two stages each including an inverter, a capacitor, and a diode, the inverter of the second stage is connected between the two supply terminals and has its input connected to the output of the inverter of the first stage, the diode of the second stage is connected to the node common to the diode and the capacitor of the first stage, and the terminal diode and the terminal capacitor are connected in series between ground and a node common to the diode and the capacitor of the second stage.

* * * * *